United States Patent [19]
Chauvet

[11] Patent Number: 5,203,318
[45] Date of Patent: Apr. 20, 1993

[54] SUN TRACKING SOLAR CONCENTRATOR

[76] Inventor: Maxime Chauvet, P.O.B. 941 Station "M", Halifax (n.S.) B3J 2Y9, Canada

[21] Appl. No.: 925,165

[22] Filed: Aug. 6, 1992

[51] Int. Cl.$^5$ ............................................. F24J 2/38
[52] U.S. Cl. ................................. 126/606; 126/605; 126/608; 126/687; 126/684; 126/696
[58] Field of Search ............... 126/424, 425, 438, 451; 353/3

[56] References Cited

U.S. PATENT DOCUMENTS

| 670,916 | 3/1901 | Eneas | 126/438 |
| 787,145 | 4/1905 | Brown | 126/438 X |

FOREIGN PATENT DOCUMENTS

| 2511740 | 9/1976 | Fed. Rep. of Germany | 126/424 |
| 48110 | 10/1981 | U.S.S.R. | 126/438 |

Primary Examiner—Carl D. Price
Attorney, Agent, or Firm—Pierre Lespérange; François Martineau

[57] ABSTRACT

The solar concentrator includes a carriage movable along an inclined, ground anchored ramp. A first weight at the end of a pulley carried first cable, biases the carriage upwardly of the ramp slope. A number of mirrors are pivotally carried by the carraige, and reflect sunrays toward a heat sink absorber. A second weight biases the mirrors to pivot in one direction, while a third weight biases the mirrors in an opposite direction. The operator can put into operation the second or third weight as he chooses. Gravity induced up or down carriage displacement allows sun tracking adjustments on an incremental, day to day basis. Gravity induced mirrors pivotal motion allow sun tracking adjustments on a continuous basis during each daylight period. Hence, all year long, solar rays reflected by the mirrors remain convergent toward the absorber.

8 Claims, 7 Drawing Sheets

SUN TRACKING SOLAR CONCENTRATOR

FIELD OF THE INVENTION

This invention relates to apparatuses for collecting, absorbing and storing solar heat in view of deferred (night-time) heating, electricity generation, or any other use.

BACKGROUND OF THE INVENTION

Solar energy is increasingly considered as a promising alternate source of electricity or deferred source of heating to residential or industrial areas. The September 1991 issue of the Scientific American magazine includes an excellent overview of recent developments in the field of efficient solar heat collection and storage apparatuses, mentioning inter alia the Luz Corp. solar concentrator installed in California, as well as the European PHOEBUS solar concentrator project.

One of the important features of an efficient solar concentrator is to provide means for biasing the solar reflectors to track the sun in the sky during daylight, so that reflected sunrays maintain convergence toward the infra-red absorber unit throughout the day. Such sun tracking means usually includes electric motors entraining into rotation, at a very slow pace, the mirror (or the array of mirrors in unison) to maintain focus of sunrays toward the absorber all day long.

For example, in U.S. Pat. No. 4,332,238 issued in 1982 to Garcia, heat sensor devices detect movement of a radiation focal point away from the absorber as a result of the diurnal cycle of the sun.

In U.S. Pat. No. 1,162,505 issued in 1915 to Nichols, an electric motor clock 25 controls tilt of sun reflectors 3, 3 through link cables 23 and pulleys, wherein the mirrors will be moved automatically in unison. Weights 26 are provided to balance the action of the pulleys and maintain the mirrors facing upward.

U.S. Pat. No. 4,159,710 issued in 1979 to the Philips corp. discloses a solar sensor based on a vaporizable/-condensible working medium partly in liquid phase and partly in gaseous phase, for rotation of reflectors to control the focusing of solar radiation on the absorber. Indeed, responsively to displacement of sun ray light spot on two working medium reservoirs, a gradient in vapour pressure is established that will bias simultaneous pivotal motion of all the mirrors forming part of the solar concentrator. Such solar sensor is said to constitute a sun tracker during daylight.

A general disadvantage of such known sun tracking systems for solar concentrators is their overall complexity, and the fact that they usually require electricity to operate the main working parts thereof. Moreover, relatively well trained operators are required, for upkeep and maintenance.

OBJECTS OF THE INVENTION

The gist of the invention is to provide a sun tracking solar concentrator of very simple make and operation, in which sun tracking motion of the reflectors is obtained by a simple power system.

An important object of the invention is to provide sun tracking means which will continuously adjust to sun motion in the sky, during a daylight period, and which can be incrementally adjusted to shifts in sun position in the sky from day to day, yearlong.

A general object of the invention is to provide a solar concentrator as disclosed above, which will be long lasting.

An object of the invention is that the present solar concentrator be hand-operated and whose elements are inexpensive to manufacture.

Another object of the invention is to enable field-based assembly and installation of the solar concentrator, while maintaining extremely high sun tracking accuracy.

SUMMARY OF THE INVENTION

Accordingly with the objects of the invention, there is disclosed an automatic solar concentrator for storing infra-red heat from sunrays, comprising: a) collector means, for sunray absorption and heat retention; b) mirror means, for reflecting incident sunrays toward said collector means; c) power means continuously pivoting said mirror means during daylight about a pivotal axis parallel to the Earth axis of rotation, from a dawn, sun facing position, to a dusk, sun facing position, so as to continuously track the sun during a single daylight period, so that the reflected sunrays continuously converge toward said collector means daylong; and d) actuator means for incrementally displacing said mirror means generally once each day, lengthwisely along an axis parallel to the Earth rotational axis, so as to continuously track the sun yearlong. For small concentrators, the power means are gravity based and the actuator means are manually operated.

BRIEF DESCRIPTION OF THE DRAWINGS

FIGS. 3–4 are enlarged cross-sections about lines 3—3 and 4—4 respectively of FIG. 2; FIG. 3 further showing the absorber, FIG. 4 being at a larger scale than FIG. 3.

FIG. 5, on the fourth sheet of drawings, is a partly broken, enlarged cross-section about line 5—5 of FIG. 2a.

DETAILED DESCRIPTION OF THE INVENTION

Figure 1:
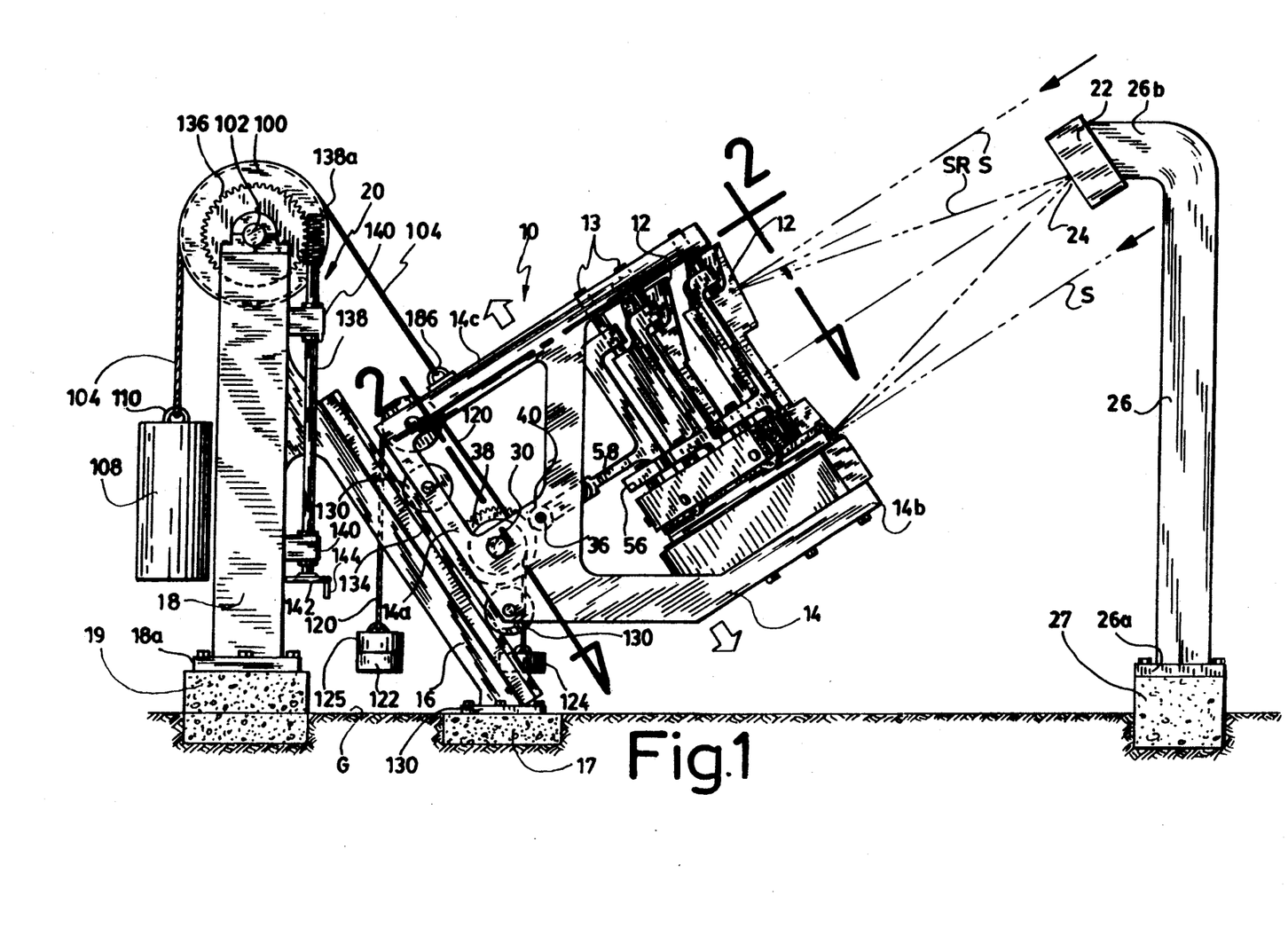
FIG. 1 is a side elevation of a preferred embodiment of sun ray collector device, suggesting how the sun rays are all made to converge toward the absorber.
Figure 2:
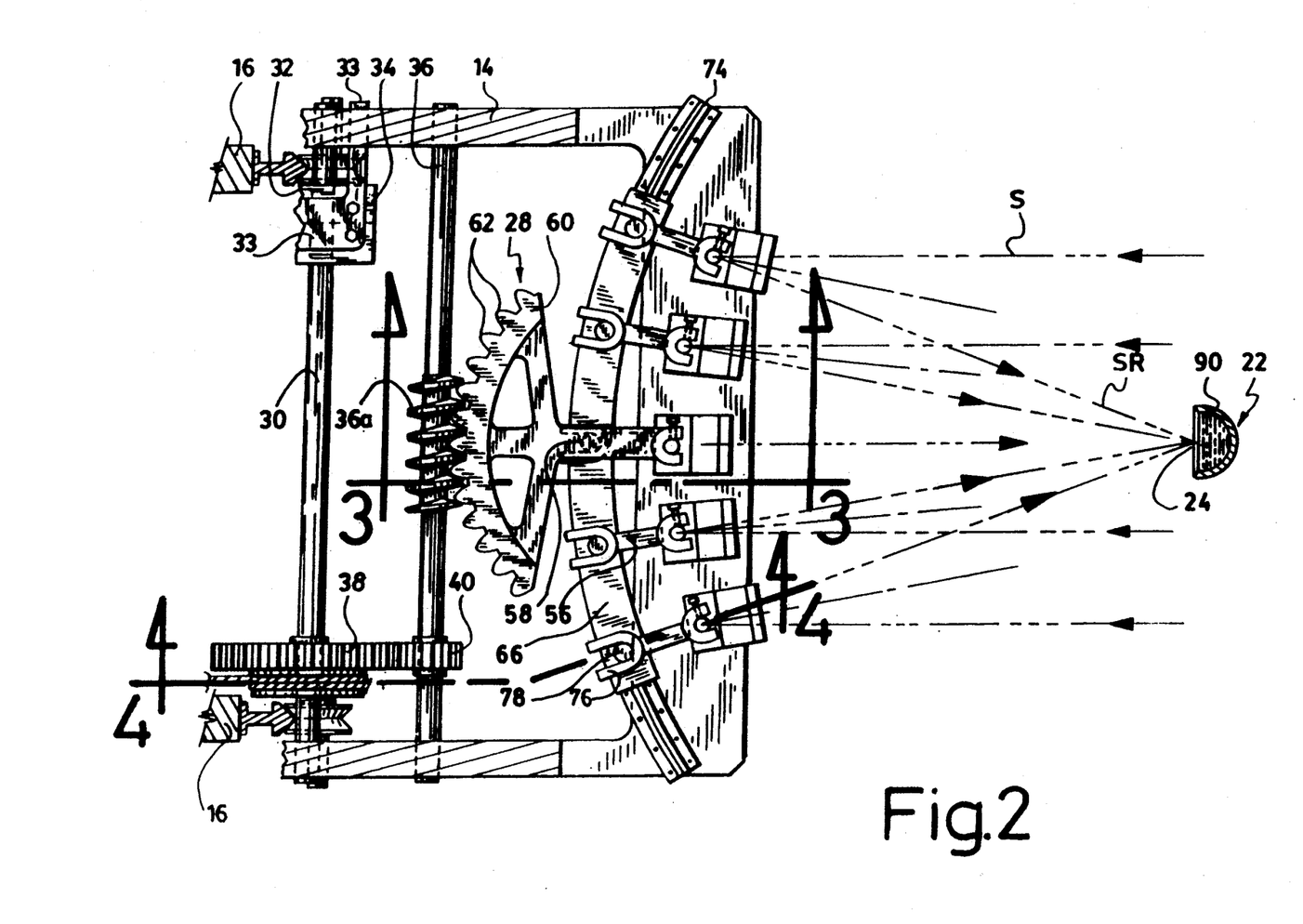
FIGS. 2–2a are sectional views about line 2—2 of FIG. 1, suggesting how the sun reflecting mirrors of the present sun ray collecting device can be continuously tilted during daylight, to follow the daily sun motion in the sky, and showing the mirrors in their noontime and 6 p.m. position respectively at equinox.

As best seen in FIGS. 1–2 of the drawings, the present solar concentrator 10 includes an upright wall 18 having an enlarged base plate 18a bolted to a concrete block 19 being embedded into the ground G. From an intermediate height section of this vertical wall 18 transversely project a pair of downwardly forwardly inclined arms 16, 16, at opposite side edges thereof. Each arm 16 has an enlarged base plate 16a, bolted to a concrete block 17 being embedded into ground G forwardly of concrete block 19. Hence, as shown in FIG. 1, the integral assembly of arms 16, 16, and wall 18 forms an inverted V-shape in side elevation, thus providing strong self support capability for a carriage 14 on which a series of reflector units 12 are mounted.

An upright post 26 is further provided frontwardly of arms 16 at a distance therefrom. Post 26 is bolted at its enlarged base plate 26a to a concrete block 27 being embedded into ground G. Post 26 defines a forwardly elbowed top end 26b which supports a sun ray collector 22. As clearly shown in FIGS. 2–2a, post 26 is located about a fore-and-aft axis generally intermediate the two lateral arms 16.

A large, open, box-like carriage frame 14 is further provided, defining a rear face 14a, being edgewisely supported spacedly over ground by the pair of inclined arms 16, 16 and a front face 14b, in spaced facing register with the top elbowed end 26b of upright post 26. The array of sun-ray reflecting units 12, for example five units, are pivotally carried by pivot axles 13, to frame 14, at the front face thereof 14b, in generally arcuately disposed fashion.

According to an essential feature of the invention, the plane of inclined arms 16, 16 and the axes of pivot 13 of the reflector units 12 must be parallel to the earth rotational axis.

Actuator means 20 are provided, for supporting said box-like frame 14 at an adjusted level along arms 16, and for incrementally changing said level in daily increments. Actuator means 20 includes a large pulley 100 (FIG. 1) which is rotatably carried at the top of upright post 18, about horizontal axle 102. Axle 102 is parallel to axles 30 and 36. A cable 104 is wound several times around pulley 100, is anchored at one end to a bracket 106 integral to the top face 14c of box-like carriage frame 14, and supports at its other end a counterweight 108 to which it is anchored by integral ear 110. Counterweight 108 counterbalances the weight of carriage 14 and of the elements carried thereby.

To provide smoothness in the displacement of reflector-carrying frame 14 over ramp 16, a few idle rollers 130 are mounted to the carriage aft-portion 14a, about axles 132 on each lateral side of the carriage 14, in register with the two inclined arms 16. A track 134 (FIGS. 2–2a and 4) is lengthwisely anchored to each stay bar 16 for guiding rollers 130.

Manual feed means 136–144 are provided, to control upward and downward displacement of the reflector-carrying frame 14 over tracks 134. These manual feed means includes a gear-wheel 136, rotatably carried by axle 102 and located laterally of main pulley 100 and made to rotate integrally therewith. A drive rod 138 is rotatably mounted vertically to post 18 by transverse ears 140. The top end section of rod 138 constitutes a worm-screw 138a in register with and meshing with gear-wheel 136.

To the bottom end of rotatable rod 138 is transversely fitted a control-wheel 142 having a transverse (vertical) handle 144 freely pivoted thereto. Hence, manual rotation of control-wheel 142 will cause upward or downward movement of carriage 14 and stopping of the latter to the precise desired level due to the braking action of the gear and worm system 136, 138a.

Infra-red radiation absorbing means or collector 22 serves to receive sun-rays S reflected as SR by reflector units 12, for capturing and absorbing the infrared (IR) component of the sun-ray electromagnetic spectrum, and for storing IR heat for a given time period.

Gravity based power means 28 simultaneously rotates each individual reflector unit 12 during each daylight period, from dawn to dusk, so that at any given time of the day, incident sun-rays S striking the center of each and every reflector unit 12 are all reflected as SR toward a single focal point 24 on the IR absorber 22. Typically, the angular speed of rotation of the reflector units 12 around their pivot axles 13, under power from gravity based power means 28, will be half that of the sun in the sky. Power means 28 operates substantially continuously, being controlled by a clockwork means 32 fixed to frame 14 by a bracket 33 (FIG. 2) and controlling the rotation of shaft 30. A manually operated brake 34 is also fixed to bracket 33 and can stop rotation of shaft 30.

During night-time, the force exerted by power means 28 is to be inverted to return the reflector units 12 from their dusk position—generally directed toward where the sun sets—to a dawn position—generally directed toward where the sun rises. Moreover, for each 24-hours period, box-like frame 14 is incrementally displaced by a very small distance over arms 16, from its lowermost position (at the winter solstice) to its uppermost position (at the summer solstice). Hence, it is understood that there will be 364 incremental night-time adjustments of the position of carriage 14 over arms 16—one for each day of the year (365 for bissextile years). That is to say, during each single daylight period, the motion of the sun in the sky will be followed in a continuous fashion by reflector units 12, under the action of power means 28; while during each six-month period (between two successive solstices), there is discrete adjustment of the position of the reflector units 12 relative to the absorber 22, in response to daily variations of the sun altitude over the horizon. The inclination of arms 16 and pivot axles 13 to the vertical will vary depending on the latitude at which the solar concentrator 10 is installed so that arms 16 and pivot axle remain parallel to the earth rotation axis.

Figure 2A:
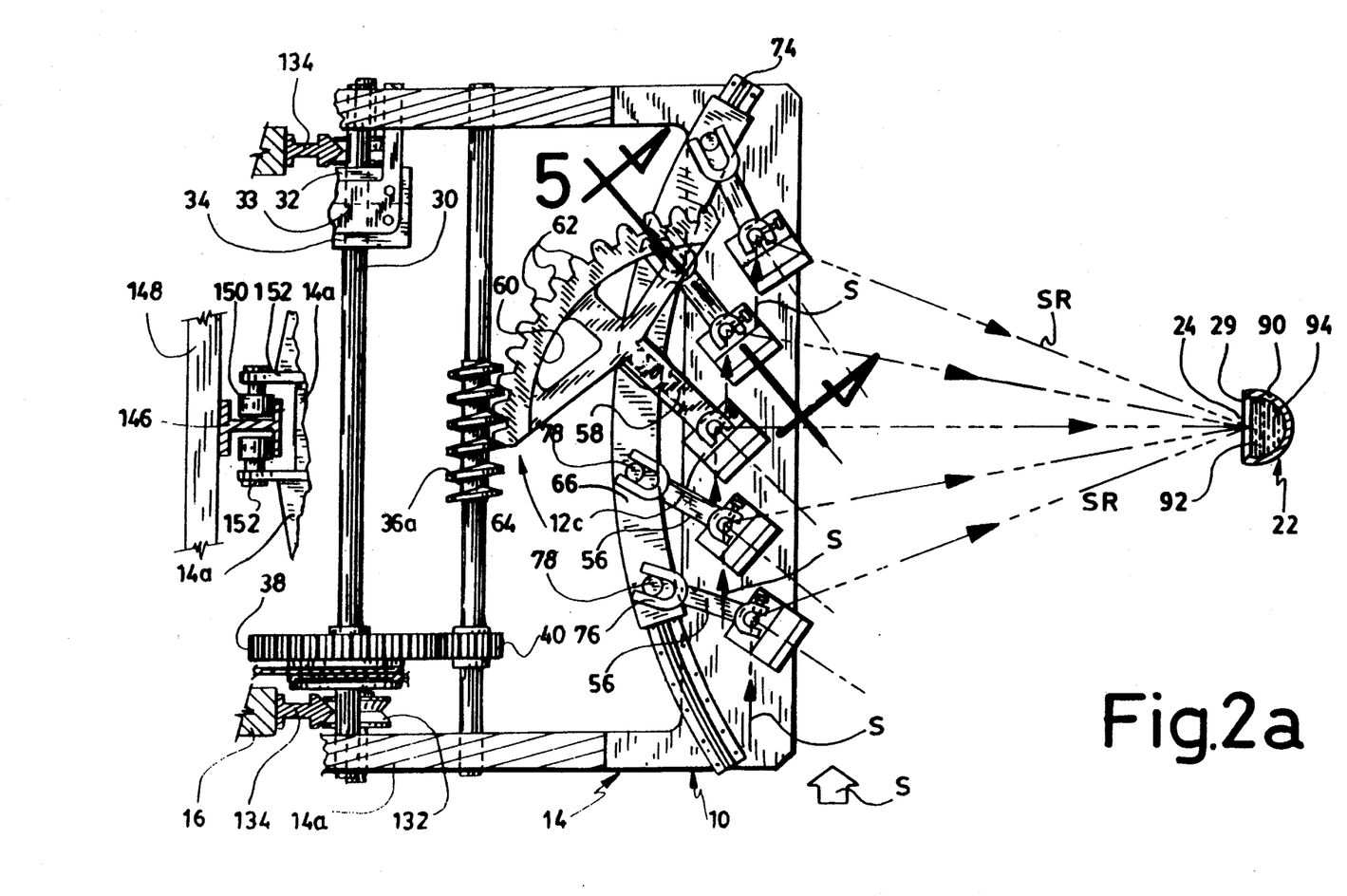
Figure 4:
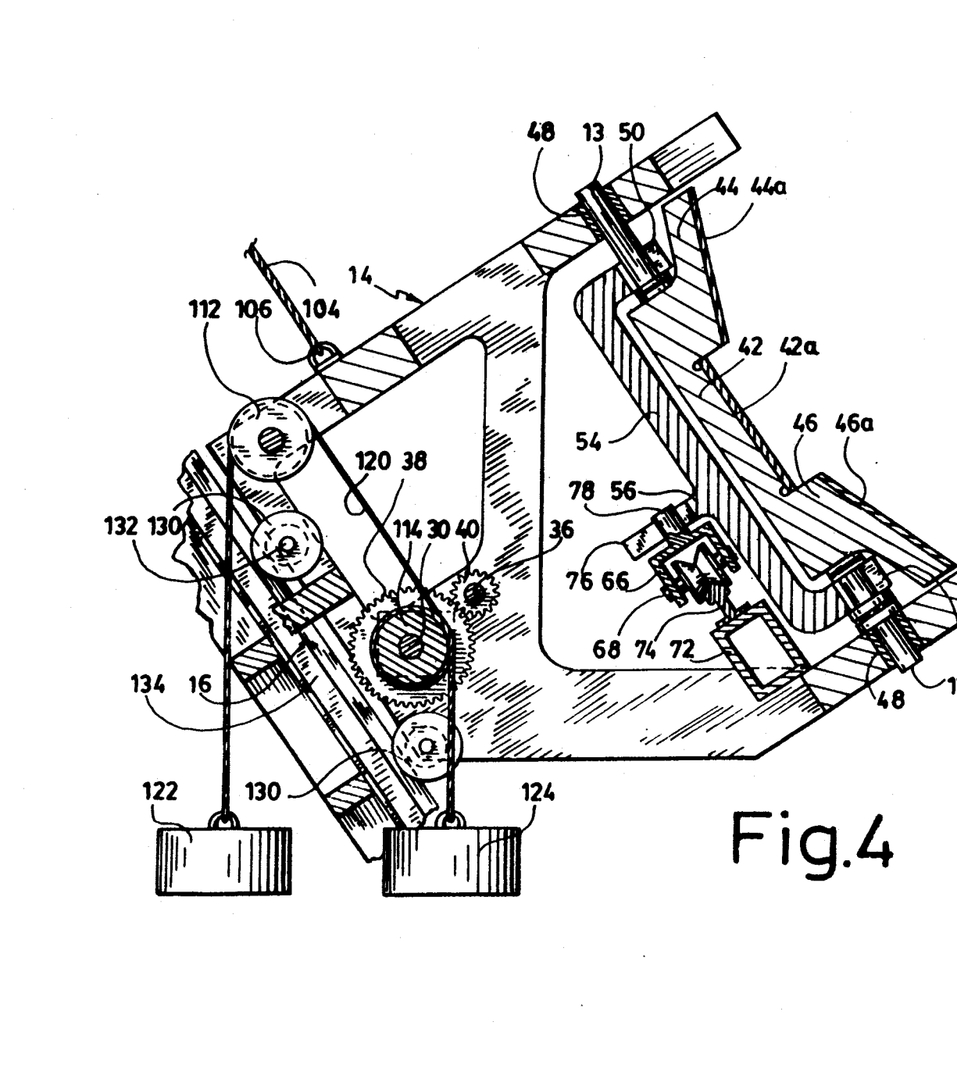
Figure 6:
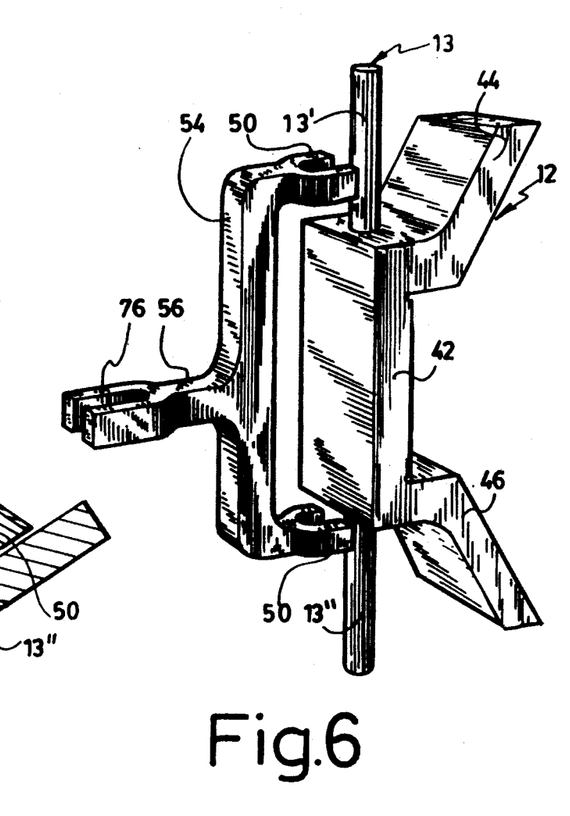
FIG. 6, on the fifth sheet of drawings, is an isometric exploded view of one reflector member and its corresponding pivot mount.

A preferred embodiment of the power means 28 for pivoting reflector units 12 about their pivot axles 13, is illustrated in FIGS. 2–2a and 4. A first, horizontal, aft-shaft 30 is journalled to the rear end 14a of box-like carriage frame 14. Weight means 122, 124,—detailed later—bias shaft 30 into rotation. A clockwork 32 and a manually operated brake 34 anchored to frame 14 by a bracket 33 apply time-yielding braking bias and a complete stop respectively onto gravity-rotated shaft 30. A second, horizontal, for shaft 36 is journalled to frame 14, being located between first shaft 30 and reflector units 12 in spaced register with the first shaft 30. Shafts 30, 36 intersect a plane orthogonal to the mirror units pivotal axes 13, and to each shaft 30, 36 is fixed a gear 38, 40 respectively located at their ends opposite to clockwork 32 and brake 34. These two gears 38, 40 mesh with each other so that rotation of drive shaft 30 biases second shaft 36 to rotate in the opposite direction. Preferably, gear 38 of shaft 30 is diametrically much larger than gear 40 of shaft 36, so that the rotation speed of the latter shaft be greater than that of the former shaft, for example by a 10:1 ratio. Second shaft 36 forms an integral worm screw 36a at its intermediate portion.

Figures 3, 5:
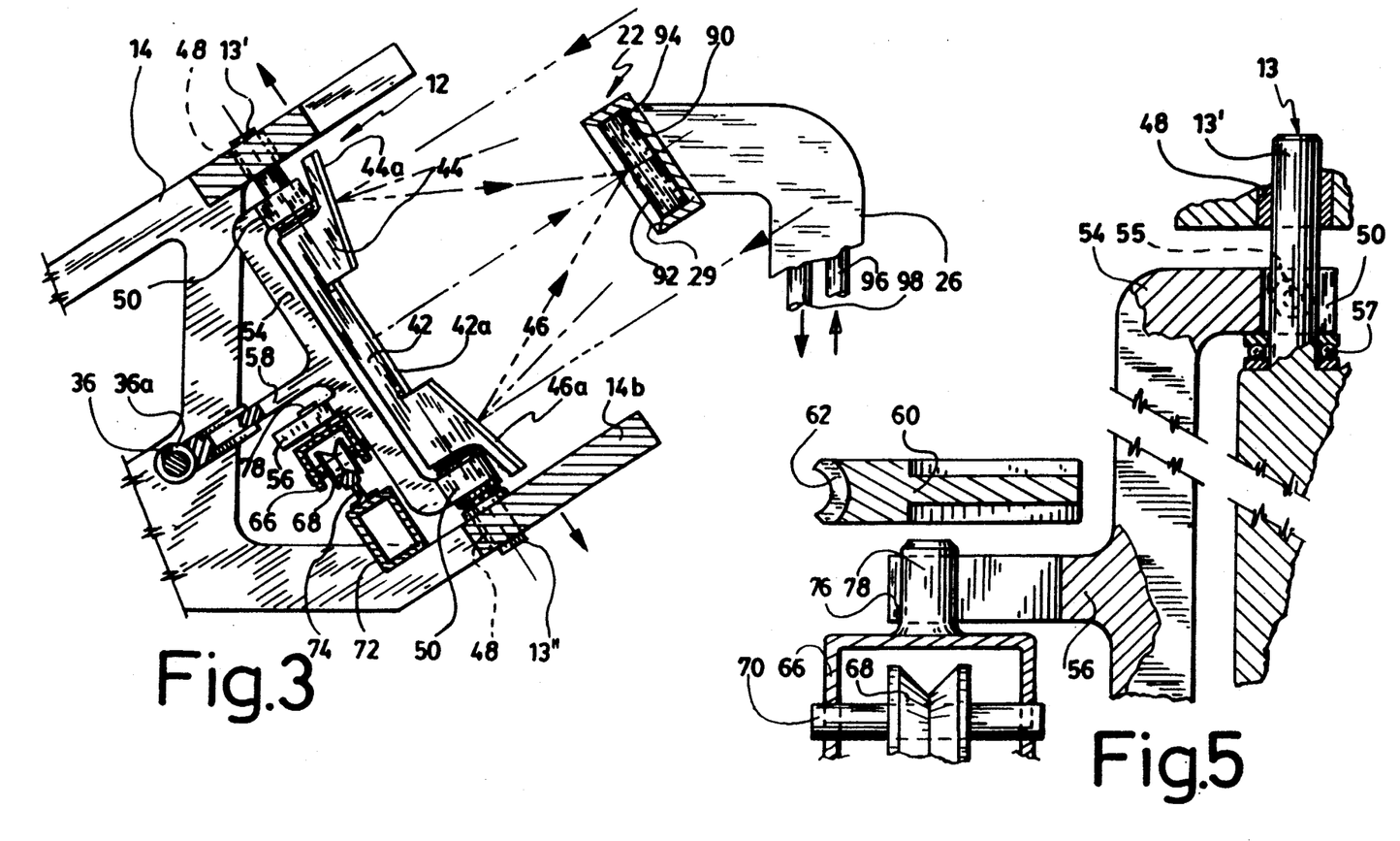

As best seen in FIGS. 3–4, each reflector unit 12 consists of a central rectangular plate 42, having a top, forwardly offset and upwardly forwardly inclined, integral extension 44, and a bottom, forwardly offset, downwardly forwardly inclined, integral extension 46. The flat front surface of each reflector section 42–46 is lined with an IR radiation reflecting sheet surface 42a, 44a, 46a. Each central reflective sheet 42a is coplanar with its pivot axle 13. The two opposite end portions 13', 13" of pivot axle 13 protrude beyond part 42 of reflector unit 12, clearing the forwardly offset inclined extensions 44 and 46, with an outer section thereof engaging rotatably into coaxial sockets 48 embedded into frame part 14b. Axle end portions 13', 13" are further engaged by Y-jaws 50, forming an integral part of a U-shape yoke member 54. Pivot portions 13, 13" are fixed into Y-jaws 50, 52 by set screws 55 (FIGS. 2a and 5). Ball bearings 57 (FIG. 5) are mounted to axles 13 between each jaw 50, and the corresponding reflector unit 12. FIG. 3 shows that reflecting surfaces 44a and 46a are equally inclined to central surface 42a so as to converge the reflected sun rays SR on point 24. In FIG. 3, this inclination has been accentuated relative to FIG. 2 so as to locate the collector 22 within the drawing.

Each yoke member 54 further includes a transverse arm 56 projecting from an intermediate section thereof in a direction opposite jaws 50 for a purpose later set forth. The yoke 54 secured to the centrally located reflecting unit 12c is further provided with a second transverse arm 58 (FIG. 3) extending spacedly above the first one 56. Arm 58 carries at its outer end an integral, open, sector-shape plate 60 having gear teeth 62 along its arcuate edge. Teeth 62 of sector plate 60 mesh with worm screw 36a of rotating shaft 36. Sector plate 60 extends about a plane orthogonal to pivot axles 13 (see FIG. 3), wherein upon rotation of shaft 36, sector plate 60 will rotate about its pivot axle 13. Reflector unit 12c will thus pivot therewith.

To ensure that all the reflectors 12, 12c pivot in unison, coupling means are provided to link pivotal motion of the yoke 54 secured to central reflector unit 12c to that of the other yokes 54—54. Such coupling means includes an arcuate inverted U-shaped carriage 66, extending beneath the arms 56 of the yokes 54. A plurality of rollers 68 are rotatably carried within the U-carriage 66 by transverse pivotal axles 70. An arcuate track bed 72 is anchored to the frame front part 14b, beneath carriage 66, and supports a track 74. Rollers 68 rollingly engage track 74. Carriage 66 rolls on track 74 in either direction for some distance, before it reaches the free ends of the track 74. As best seen in FIG. 5, the free end of each arm 56 includes a yoke member 76, and a number of integral studs 78 (corresponding to the number of reflector units 12), project upwardly from carriage 66 so as to rotatably engage corresponding yoke members 76. Track 74 and studs 78 are located on a circular arc which is concentric to the circular arc on which pivot axles 13 are disposed. Both circular arcs have a center of curvature which is also the focal point 24 of absorber 22. The point of convergence of the perpendiculars to the centers of the mirrors 42a–46a in a meridian plane (FIG. 1) and in a plane parallel to the equator (FIG. 2) in the mirror position of FIG. 2 is denoted anti-focal point C.

The power means 28 rotating shafts 30 and 36 consists of a pair of counterweights 122, 124 of equal mass attached to the opposite ends of a cable 120 which is a trained on an idle pulley 112 carried by frame 14 and then wound a few turns on a drive pulley 114 secured to shaft 30 adjacent gear 38.

Either weights 122 or 124 can be made heavier than the other, by placing on its top, by hand, a mobile supplementary weight 125. At dawn, clockwork 32 has been stopped and brake 34, applied so as to prohibit any movement; weights 122, 125 are up, and weight 124 is down. When the starting moment comes by, the operator disengages brake 34 and starts clockwork 32. Weights 122, 125 fall, rotating shaft 30 and causing weight 124 to rise. Clockwork 32 lets shaft 30 rotate at regular intervals.

The operator can stop clockwork 32 in a position that allows shaft 30 to rotate freely in case it has been started too late; or he can stop clockwork 32 in a position that stops shaft 30 in case it has been started too soon. The large end gear 38 of shaft 30 entrains the much smaller end gear 40 of fore shaft 36, Thus, shaft 36 rotates continuously, but at a much larger speed than aft-shaft 30. As fore-shaft 36 rotates, worm screw 36a engages successive edge teeth 62 of the sector plate 60, thus arcuately displacing the latter around pivot 13c from a first limit position at dawn (not illustrated), to an intermediate (noontime) position illustrated in FIG. 2, to a second limit position at dusk shown in FIG. 2a.

At dusk, the clockwork is stopped and brake 34, applied; weights 122, 125 are all the way down and weight 124, all the way up. The supplementary weight 125 is switched by hand from weight 122 to weight 124. Clockwork 32 is then put in a position that allows shaft 30 to rotate freely and brake 34 is released. Falling weights 124, 125 make shaft 30 and mirrors 12 rotate in a direction opposite to that of their daylight direction of rotation, until they have reached their initial dawn position. The speed of rotation of shaft 30 is controlled by hand through brake 34.

During translation of sector gear 60, arcuate carriage 66 is biased to ride over track 74, since carriage 60 is integrally connected thereto via arm 58 of the central reflector unit 12c. The displacement of carriage 66 will in turn pivot each transverse arm 56 through the action of studs 78. Hence, yokes 54 will pivot around their axles 13. Since fore jaws 50, 52 of the yokes 54 are mounted to their pivot axles 13 by set screws 55, and since reflector units 12 are integral with their pivot axles 13, as yokes 54 rotate about their fore axles 13, reflector units 12 pivot therewith. The pivot axles 13 being equally spaced in successive pairs, all the units 12 rotate at the same mean angular speed, namely that of the central unit 12c which is half the apparent speed of the sun in the sky.

Figure 8:
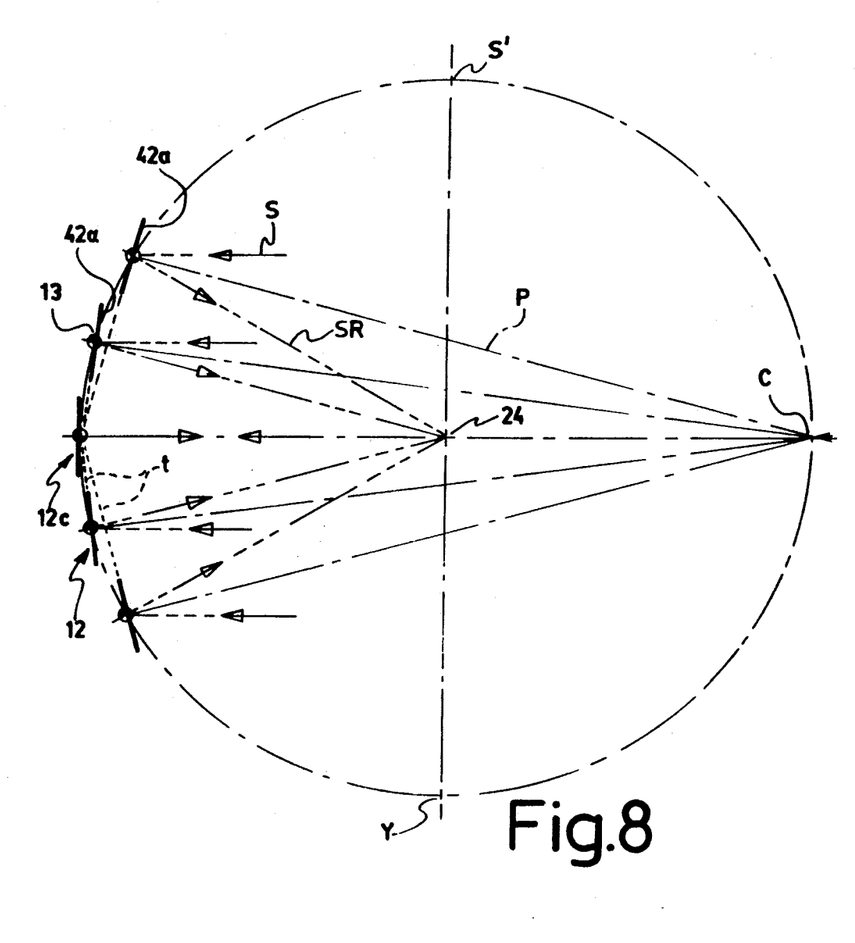
FIG. 8 and 9 are diagrams in plan view showing the arrangement of the mirrors in the positions of FIGS. 2 and 2a respectively.
Figure 9:
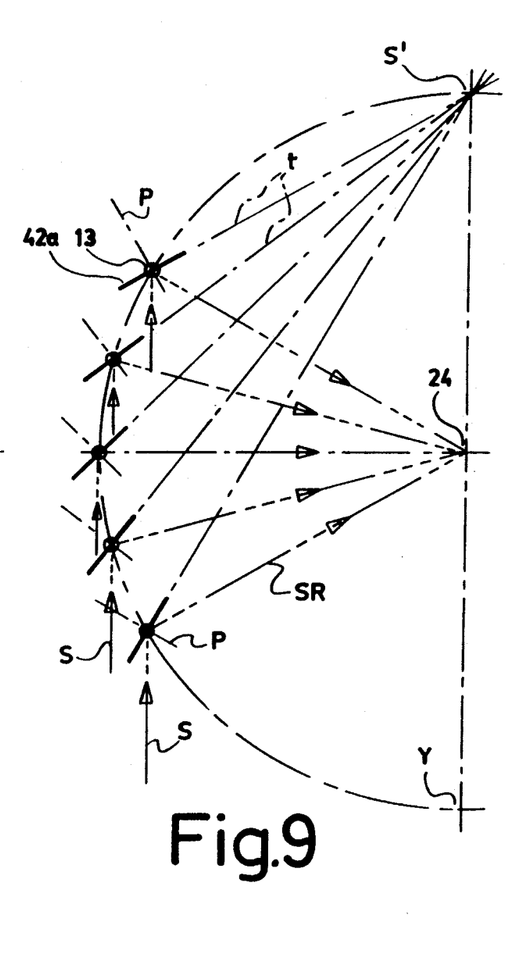

As clearly shown in FIGS. 2–2a, the specific orientation of each reflector unit 12 relative to the other units 12 change over time. Indeed, it is essential that the specific planar orientation of the reflecting surfaces 42a–46a of all the units 12 be such that sun-rays incident on the centers of the mirrors be reflected to continuously converge toward the point 24 of the absorber means 22. This is made possible by precisely defining and setting critical parameters including:

the center of curvature of carriage 66, and of pivot 13 coincides with point 24;

pivot 13 coincides with the plane of each central mirror 42a;

the individual angular adjustment, in a plane parallel to the equator, of each unit 12 relative to its actuating arm 56. This adjustment is made by rotating the reflector units with respect to yoke 54 using set screws 55 so as to obtain the reflector orientation shown in FIG. 8. The point of convergence C of the perpendiculars P to the mirror centers, or antifocal point C lies on the perpendicular to the center of the central mirror unit 12c which passes through focal point 24. Obviously the distance of focal point 24 to mirror unit 12c is half the distance of antifocal point C to mirror unit 12c. With all the mirror units so adjusted, their trace T converges at the center of central unit 12c. In the FIG. 9 rotated position of the mirrors, it is seen that traces T converge at point S' and that perpendiculars P converge at point Y, points S' and Y being 180° apart and at 90° from antifocal point C and lying on the circle passing through point C and having focal point 24 as its center. Obviously, the angle between the planes of mirror units 12 and their associated actuating arms varies from one unit to the next one; obviously clockwork 32 must be precise and adjusted to the time of day.

As suggested in FIG. 3, one embodiment of IR absorber 22 at the top end of upright post 26, would include a fluid-tight, box-like casing 90, having a front IR transparent window 92. Window 92 should be parallel to the reflectors' pivot axles 13. A frame 29 surrounds window 92; it is made of reflecting material. Rays that fall outside window 92 are reflected back to it by frame 29. Casing 90 forms a fluid chamber through which continuously circulates a heat-vector fluid 94, fed by a fluid intake line 96 and discharged by a fluid outlet line 98. Fluid lines 96, 98 extend preferably within the hollow of post 26, the wall of post 26 and of casing 90—except for transparent window 92—then most preferably being made from a thermally insulating material. Conventional pump means (not shown) circulate the fluid 94 through lines 96 and 98, (see arrows 97 and 99 respectively) for discharge into a steam turbine electricity generating plant (not shown), at a distance from the IR collecting apparatus 10.

Fluid 94 is of the type having a high thermal inertia, such as water; when passing through chamber 90, it is heated by the IR radiation component from the sunrays, reflected by mirrors 12.

Alternately, other types of IR collectors 22 are envisioned to be comprised within the scope of the invention: for example, photovoltaic cells may be provided at the top of post 26, to transform solar radiation directly into electricity. In such an embodiment, fluid lines 96, 98 would be replaced by electric lines which would extend through the hollow of post 26, and into the ground toward industrial or residential consumers.

It is understood that the mirrors' reflecting surfaces 42a, 44a, 46a, need not necessarily be flat (FIG. 4), although such arrangement is advantageous in that it is cheap to manufacture. Alternately, the mirrors 12 could be of the parabolic type, or concave, biconcave, circular or other type, provided that they are correctly oriented, that their axles of rotation are parallel to the axis of rotation of the Earth, and that they can be moved in a direction parallel to that same axis. Moreover, there can be any number of mirrors 12, 42a, 44a, 46a.

As illustrated in FIG. 2a, to prevent accidental forward-downward tilt of carriage 14 from inclined support ramps 16, there is further provided a cross-sectionally H-beam 146, located intermediate beams 16, 16 parallel thereto and connected to these beams 16, 16 by integral transverse bars 148. A pair of closely spaced idle rollers 150, are pivotally carried in facing register with one another to a pair of laterally spaced arms 152, which rearwardly depend from rear frame portion 14a. Iddle rollers 150, are lengthwisely engaged into the two opposite channels of H-beam 146, for lengthwise displacement therealong. Hence, the fore leg of H-beam 146 forms a flat rolling track for rollers 150.

Preferably, the position of the absorber 22 is pointed out on a ruler, graduated in days of the year, by a pointer (not shown). The ruler is fixed on the absorber and the pointer, on the ground. Similarly, the carriage 14 may also be fitted with a ruler and a pointer (not shown).

This IR collector 10 presents many advantages:

a) The collector 10 can be very easily operated. The setting at night and the rotation during the day are the same and are carried out simultaneously for all the mirrors. Moreover, the mechanisms controlling all these movements are of the utmost simplicity: small units can be hand-operated and therefore, there is no need for motors, computers or remote control devices;

b) the area of the absorber 22 where the reflected sunrays SR fall, preferably equals that of a single mirror 12, 44 or 46, all the mirrors 12, 44 or 46 being of the same size. Thus, with a large number of mirrors 12, 44 or 46, a very high sun-ray concentration ratio is obtained and consequently, very high temperatures are obtained;

c) the collector 10 can be built of any power output size, from the kilowatt range up to the megawatt range;

d) the concentrator 10 and the collector 22 can be used to generate electrical energy e.g., but it can also be combined with an air well to extract the air humidity, since even desert air carries some water humidity. Air will be heated in the fluid absorber 94, and this heated air will drive an air compressor; the compressed air will be stored in an insulated storage tank. At night, the storage tank would be allowed to discharge stored heat. Then, at dawn, the compressed (and cold) air from the storage tank will be injected into another storage tank, an "air well" drawing air from the outside. The drop of pressure of the previously compressed air will considerably lower its temperature and its moisture content, and that of the sucked air will then condensate in the interior of the air well. Again, no external source of energy is required.

Figure 7:
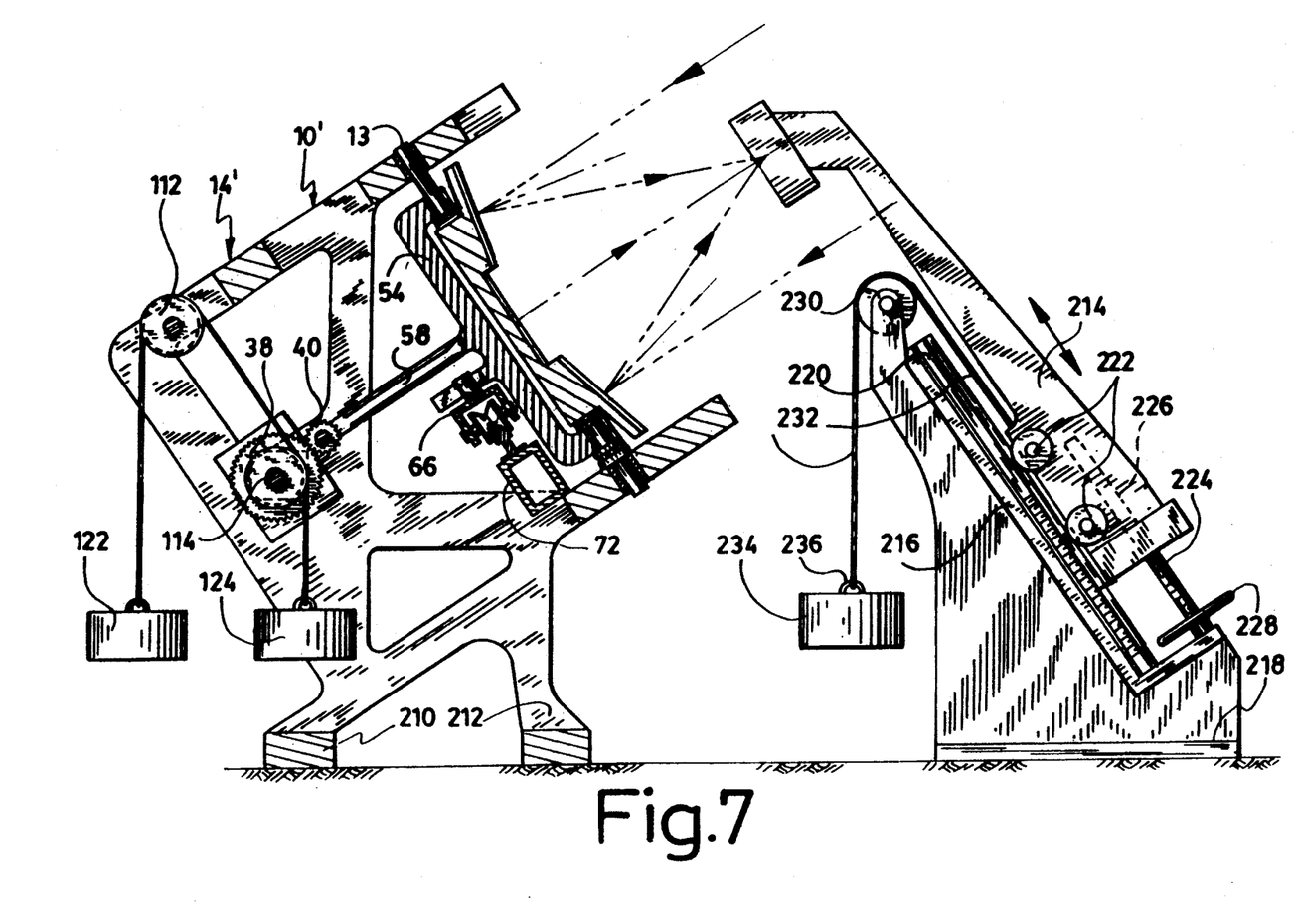
FIG. 7 is a view similar to FIG. 1, but showing an alternate embodiment of the invention, where the absorber is itself movable relative to the ground while the tiltable mirrors are not.

FIG. 7 shows an alternate embodiment of sun collecting and thermal conversion apparatus 10'. In apparatus 10', the height of IR absorber 22' is made adjustable, and the height of reflector units 12' is fixed, whereas in apparatus 10, the reverse was true. More particularly, the post 18 and ramp 16, cable 104 and weight 108, and track wheel assemblies 130, 134, 150 and 152 of apparatus 10, are now removed in apparatus 10'. Carriage 14 therefore simply stands on the ground in the same inclined position, by short integral aft feet 210 and longer integral fore feet 212. The reflector gravity based power pivoting means 28 remains the same as in apparatus 10.

In apparatus 10', IR absorber 22' is carried at the end of a movable boom 214 supported over an inclined ramp 216, spacedly frontwardly of self-standing reflector-carrying framework 14'. Ramp 216 is supported by a large, integral, ground-standing base 218, and extends along an axis parallel to the reflectors' pivotal axies 13. Ramp 216 supports a track 220, engaged by idle wheels 222 carried at the lower portion of the boom 214. A threaded rod 224 rotatably projects from base 218 spacedly parallel from ramp 216 and coaxially to boom 214. Boom 214 includes at its inner end an elongated threaded cavity 226, threadingly engaged by at least part of rod 224. A control wheel 228 at the base of rotatable rod 224 facilitates manual rotation of the rod 224 to move boom 214 upwardly or downwardly along ramp 216. The top end of base 218 carries an idle pulley 230 for guiding a cable 232. Cable 232 is anchored at one end to a counterweight 234, by bracket 236, and at its opposite end to a lower end portion of boom 214 proximate rollers 222. Counterweight 234 substantially decreases the physical effort required for moving boom 214 by the manual control wheel 228. During the boom motion, the IR capture window 92 of the sun-ray absorber 22' should remain parallel to the reflector pivotal axles 13.

Both apparatuses 10 or 10' are hand-operated, i.e. there is no need for a constant speed electric motor to drive the shafts 30, 36.

Assembly of the apparatus 10 or 10' will now be summarily described.

We will call "focal distance" the distance between the centre of the central composite mirror 12c and the focal point (to coincide with the geometric centre of window 24). We will call "anti-focal point" C a point symmetrical of the central point in relation to the focal point 24. At noon, at the equinox (FIG. 2) the centers of the reflecting surfaces 42-46 of the central reflector 12c are on the meridian plane, on a circle whose centre is the focal point; the normals on the centers of those mirrors all go through the anti-focal point C.

All the other reflectors 12 are identical to the central reflector 12c; however, they are oriented differently. When it is noon at the equinox (FIG. 2 and 8), the normal in the centre of the central reflecting surface 42a in any composite reflector 12 goes through the anti-focal point C, and the sun-rays reflected by all the mirrors 12 fall in their totality on the window 92 of the absorber 22.

At the factory, the framework 14, all its parts being ready to operate with the exception of the coupling bars kept unbolted, is mounted on a bench in such a way that the axis 13 of the reflectors 12 are vertical; the arcuate carriage 66 is then moved to the position corresponding to noon (FIG. 2). A thin vertical string (cross-hair) is installed at a distance twice that of the focal distance from the axis of the central composite reflector 12c, in the plane of symmetry of the framework 14 and of the array of reflectors 12. The operator, standing behind the string (or cross-hair) so as to see it coincide with the middle of the central reflector 12c, then instructs an assistant operator to rotate the central reflector 12c unit the operator sees the image of the string (or cross-hair) in the mirror coincide with the vertical string; the assistant then bolts the yoke 54 to the mirror axle 13 by means of the two set screws 55. Then, the two operators proceed in the same fashion with each and every one of the remaining reflectors 12.

In the field, a light armature is installed on top of the post 26 supporting the absorber 22. The framework 14 or alternately the absorber 22' is moved to the position corresponding to the summer solstice. On top of the armature, at a distance from the anti-focal point C equal to the course of the framework 14 (or of the absorber 22) from the position corresponding to the equinox to that corresponding to the summer solstice and on the polar axis of the anti-focal point, is installed a rotating sight (not shown) aimed at the reflectors 12. The reflectors are then oriented in the same way as in the shop by means of the sight. Of course, when all is finished, the armature is taken away.

It is understood that the present apparatus 10 or 10' can be used to generate hot water and steam in a continuous fashion in countries with abundant sunshine. The present apparatus is particularly destined for remote areas without electrical utility services, for the continuous sun tracking motion of the reflectors 12, 12' and/or the sunray collector 22', since the apparatus depends upon gravity based cable and pulley mechanisms. For example, the present sun-ray concentrator 10 is well suited for use of the African continent: there is ample sunlight, the personnel training for period unkeeping is very simple, the apparatus is long lasting, it is of low manufacturing cost. The solar energy absorber 22 can alternately be any device capable of utilizing the infrared energy, such as a vessel containing as in the above-described case a fluid to be heated, air or water for example.

This energy absorber has to be relatively small if hand operated, but bigger ones can built to be driven by constant speed electrical motors.

I claim:

1. A sun tracking solar concentrator for collecting and storing infra-red heat from sun-rays sun-rays, comprising:

a first, ground-embedded frame having an upper portion;

collection means, fixedly mounted to said first frame upper portion, for sunray absorption and heat retention;

a second, ground-embedded frame located at a selected distance from said first frame, said second frame including an inclined ramp in spaced facing register with said collector means, the latter inclined ramp to extend about a plane substantially parallel to this Earth's axis of rotation;

carriage means, movably mounted to said second frame inclined ramp, for slopewise displacement thereover;

mirror means, carried by said carriage means for reflecting incident sunrays toward said collector means;

power means, for continuously pivoting said mirror means relative to said carriage means during daylight about pivotal axes to be parallel to the Earth's axis of rotation, from a dawn, sun-facing position, to a dusk, sun-facing position, so as to continuously track the sun during a single daylight period, whereby the reflected sunrays continuously converge toward said collector means daylong; and actuator means for incrementally displacing said carriage means and associated mirror means, once each day, slopewisely of said second frame inclined ramp, so as to continuously track the sun yearlong.

2. A sun tracking solar concentrator as defined in claim 1;

wherein said power means further includes inversion means, actuated during nighttime to reverse the direction of pivotal rotation of said mirror means so as to return said mirror means to said dawn position during nighttime.

3. A sin tracking solar concentrator as defined in claim 2, wherein said power means are gravity-borne power means.

4. A sun tracking solar concentrator as in claim 2, wherein said carriage means consists of an open, box-like framework having front and rear portions and top and bottom portions, said rear portion movably mounted over said inclined ramp, said actuator means adjusting the level of said carriage framework along said ramp; said mirror means being mounted to said carriage front portion.

5. A sun tracking solar concentrator as in claim 4, wherein said mirror means includes at least a few reflector members, each reflector member individually pivoted to said carriage means spacedly from one another and defining a reflecting surface and being pivotally mounted to said carriage top and bottom portions about a corresponding pivotal axis to be parallel to the Earth rotational axis; and wherein said power means includes:

(a) a link member, interconnecting all of said reflector members and movable during sun tracking so that said reflecting surfaces thereof continuously face said collector means from sunrise to sunset;

(b) a rotatable shaft, carried by said carriage framework and defining a worm screw portion;

(c) a first weight block, biasing into rotation said shaft via cable and pulley means;

(d) a sector plate have a geared arcuate edge meshing with said shaft worm screw portion; and (e) means for operatively interconnecting said sector plate to said link member whereby rotation of said shaft induces swing motion of said sector plate and concurrent displacement of said link member for simultaneous pivotal motion of said reflector members for sun tracking.

6. A sun tracking solar concentrator as in claim 5, further comprising motion inversion means which includes a second weight block, biasing into rotation said shaft via second cable and pulley means in a direction opposite that biased by the first mentioned weight block.

7. A sun tracking solar concentrator as defined in claim 1, wherein said mirror means includes a number of reflector members each individually pivoted to said carriage means spacedly from one another and chosen from the group of reflector members of the type including: simple, composite, plane, concave, and biconcave reflector members.

8. A sun tracking solar concentrator for collecting and storing infra-red heat from sun-rays, comprising:

a first, ground-embedded frame, said first frame including an inclined ramp, the latter inclined ramp to extend about a plane substantially parallel to the Earth's axis of rotation;

carriage means, movably mounted to said first frame inclined ramp for slopewise displacement thereover, said carriage means having an upper portion;

collector means, fixedly secured to said carriage means upper portion, for sunray absorption and heat retention;

a second ground-embedded frame, located at a selected distance from said first frame;

mirror means, carried by said second frame in facing register with said collector means, for reflecting incident sunrays toward said collector means;

gravity-borne power means, for continuously pivoting said mirror means relative to said second frame during daylight about a pivotal axis to be parallel to the Earth's axis of rotation, from a dawn, sun-facing position, to a dusk, sun-facing position, so as to continuously track the sun during a single daylight period whereby the reflected sunrays continuously converge toward said collector means daylong; and manually operated actuator means, for incrementally displacing said carriage means and associated collector means, once each day, slopewisely of said first frame inclined ramp, so as to continuously track the sun yearlong.

* * * * *